July 12, 1955
E. M. KELLY ET AL
2,713,026
FLOTATOR-CLARIFIER
Filed July 21, 1951
3 Sheets-Sheet 1
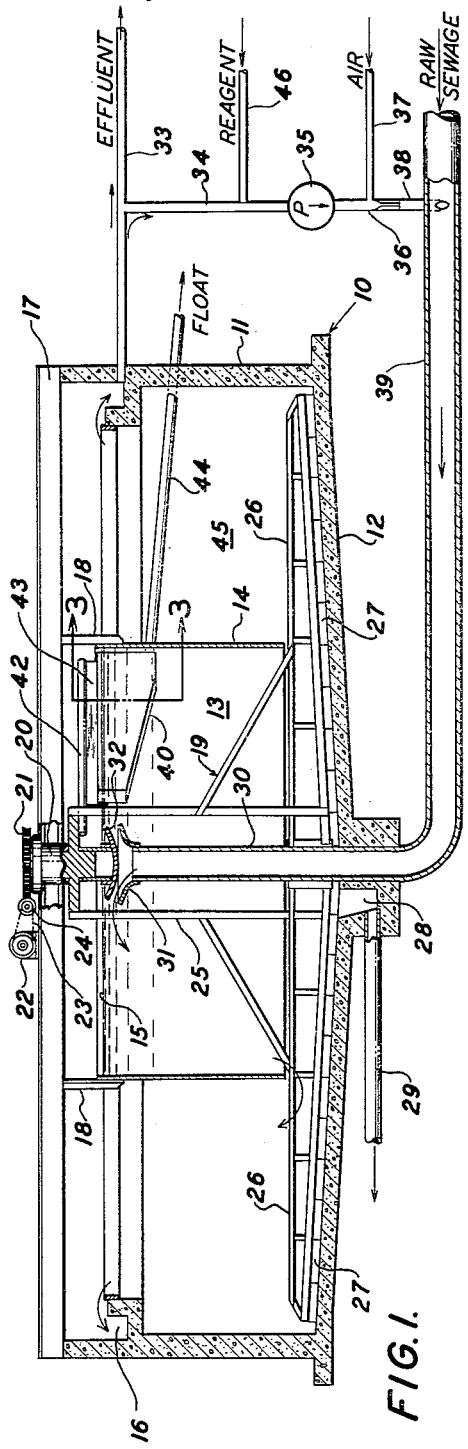
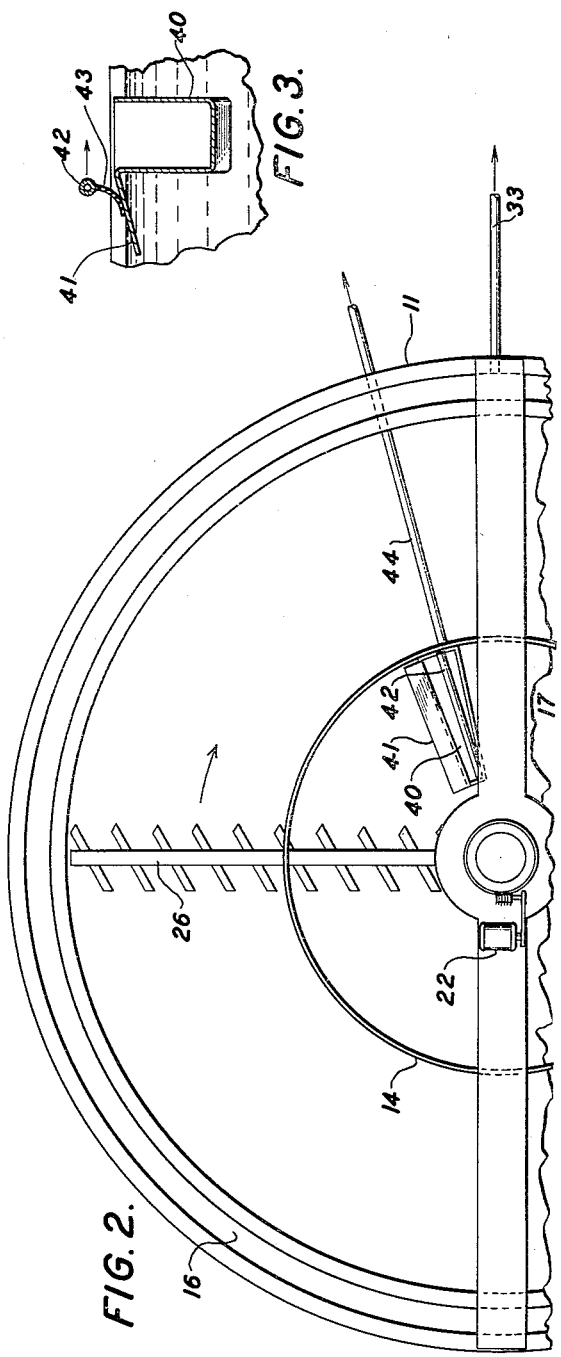
INVENTORS.
EARL M. KELLY
ARTHUR M. KIVARI
BY *James B. Christie*
ATTORNEY July 12, 1955
E. M. KELLY ET AL
2,713,026
FLOTATOR-CLARIFIER
Filed July 21, 1951
3 Sheets-Sheet 2
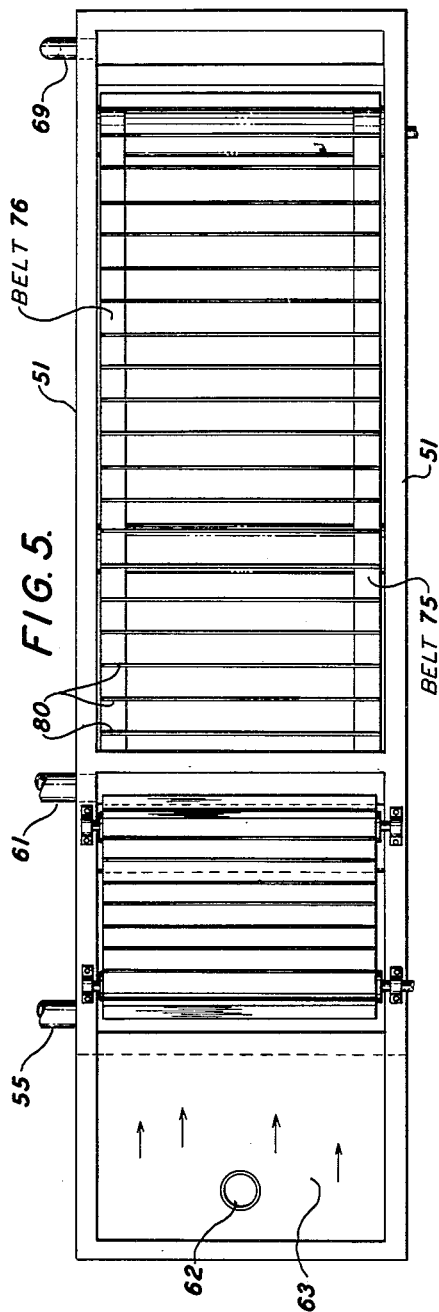
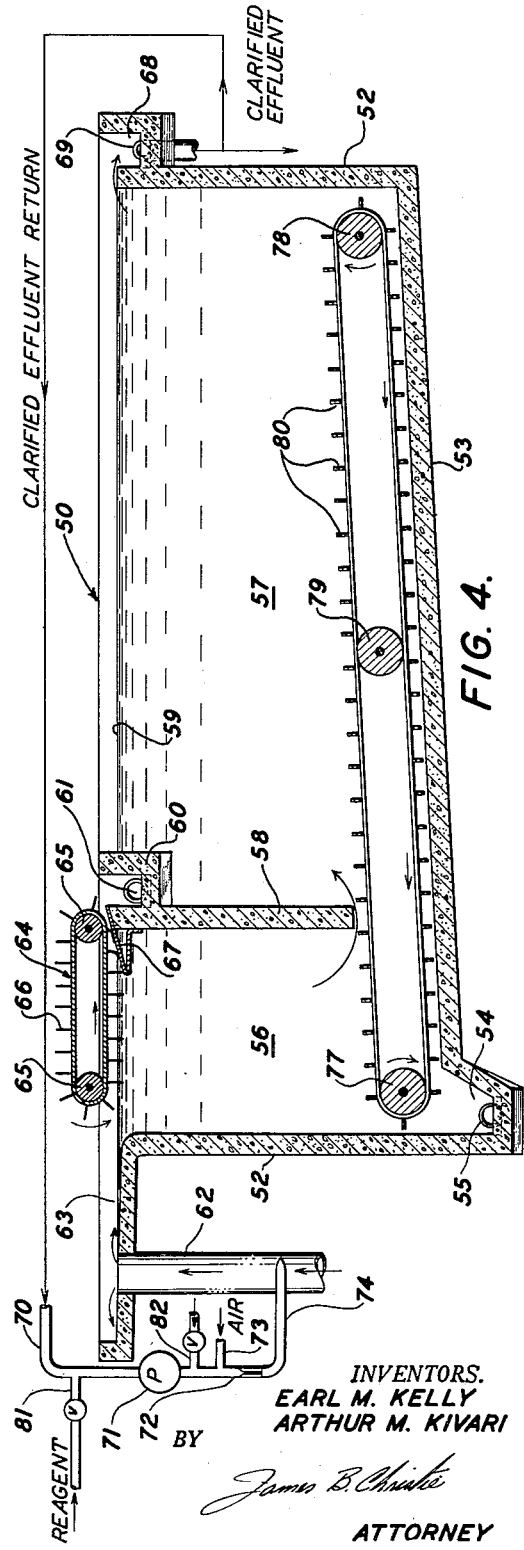
INVENTORS.
EARL M. KELLY
ARTHUR M. KIVARI
BY
James B. Christie
ATTORNEY July 12, 1955  E. M. KELLY ET AL  2,713,026
FLOTATOR-CLARIFIER Filed July 21, 1951  3 Sheets-Sheet 3

INVENTORS.
EARL M. KELLY
ARTHUR M. KIVARI
BY

ATTORNEY 2,713,026

FLOTATOR-CLARIFIER

Earl M. Kelly, Hillsborough, Burlingame, and Arthur M. Kivari, Los Angeles, Calif., assignors to Process Engineers Incorporated, San Francisco, Calif., a corporation of California Application July 21, 1951, Serial No. 237,914

9 Claims. (Cl. 210—3)

This invention is concerned with the removal of solids from a suspension thereof in liquid and, although of general utility, is particularly adapted to the treatment of sewage containing organic matter in solution as well as in suspension. The invention provides improvements in both method and apparatus for the removal of suspended solids and contemplates the removal of such solids simultaneously by flotation and settling in the same pool of liquid.

It is customary to subject sewage and other waste waters containing suspended solids to sedimentation so that the solids settle out, and a great variety of equipment for such an operation is available. However, sewage and many other waste waters contain a variety of solid particles. Some tend to settle with relative rapidity, some tend to settle slowly or to remain in suspension indefinitely and some tend to float. In accordance with our invention, particles which tend to settle slowly or to remain in suspension indefinitely are caused to float in the same body of liquid in which other particles settle, the result being a very great increase in the capacity of the treatment apparatus and marked economy in both the cost of the apparatus and the cost of operation.

The process of the invention preferably involves returning a portion of the clarified effluent. The returned effluent is charged with an excess of dissolved gas, say air or carbon dioxide, and the charged effluent is introduced into the upper part of a first portion of a relatively quiescent pool of the liquid being clarified. The suspension to be treated, either alone or mixed with the charged effluent, is introduced into the same region. The dissolved gas comes out of solution in the pool and attaches itself as fine bubbles to some of the solid particles. These are buoyed up to the adjacent surface of the pool and removed by skimming. Other suspended particles which are too heavy to be buoyed up by the fine bubbles or of such nature that the bubbles do not easily attach to them, tend to settle. This tendency is aided by causing the liquid to travel downward in the first portion of the pool, so that some solids accumulate on the underlying bottom. The liquid is then caused to flow upward slowly in a second and adjacent portion of the pool. In this second portion, solids continue to settle. The clarified effluent is removed from an upper part of the second portion of the pool, and settled solids are removed from the lower parts of both pool portions.

Fresh liquid, rather than clarified effluent, may be charged as described above and employed to bring about flotation, but this is generally less satisfactory since it involves unnecessary dilution of the liquids in the apparatus and increases the volume of liquid to be treated.

Preferably the settled solids from the two portions are intermingled and removed together.

The charged liquid and the suspension to be mixed may be introduced together or separately. If the two are introduced separately, it is desirable to introduce the charged liquid below the level at which the suspension is introduced, so as to afford a greater opportunity for the gas to attach itself to particles to be floated.

Apparatus for the practice of the invention may take a variety of forms, several of which are later described in detail. Preferred forms have a tank separated into two compartments by an upwardly extending baffle, with the two compartments in communication with each other below the baffle and adjacent the bottom of the tank. An upright round tank with an annular baffle is suitable. So is an elongated rectangular tank with a baffle extending across it from side to side.

The settled solids may be removed from outlets in the bottom of either or both compartments, but it is preferable to rake the solids from both to an outlet port in the first or flotation compartment. The sludge thus moves counter-current to the liquid.

The foregoing and other features of the invention will be understood clearly in the light of the detailed description which follows and which is illustrated by the accompanying drawings in which:

Fig. 1 is a vertical schematic section through a form of the apparatus of the invention employing a round tank;

Fig. 2 is a fragmentary plan view of the apparatus of Fig. 1;

Fig. 3 is a fragmentary sectional view of a portion of the apparatus of the foregoing figures taken along the line 3—3 of Fig. 1;

Fig. 4 is a sectional view of another form of the apparatus of the invention employing a rectangular tank;

Fig. 5 is a plan view of the apparatus of Fig. 4;

Figure 6:
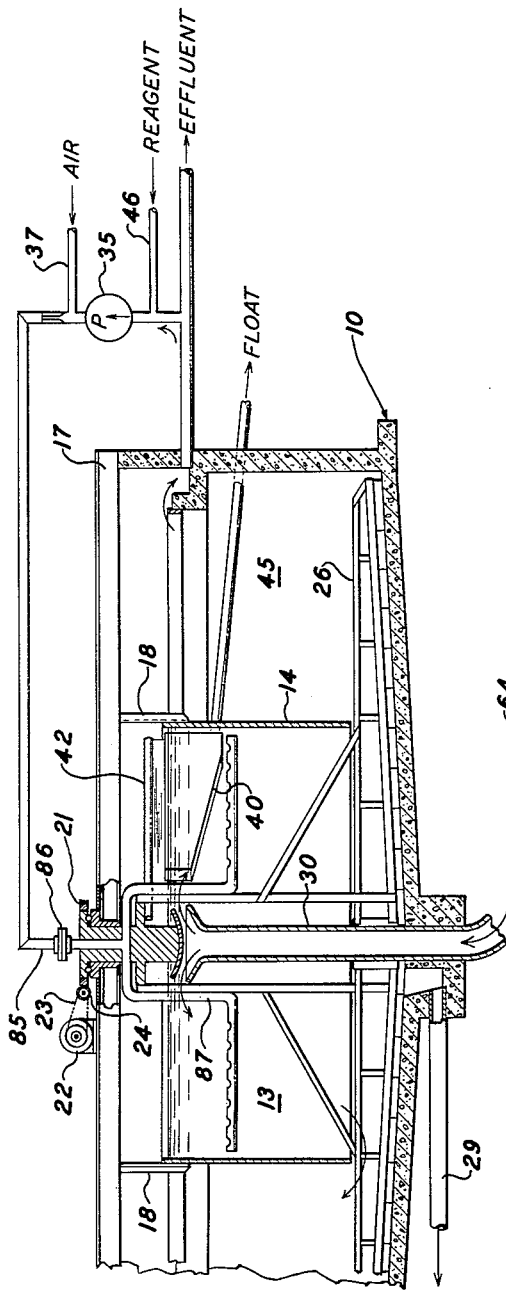
Fig. 6 is a fragmentary sectional view illustrating a modification of the apparatus of Figs. 1, 2 and 3.

The apparatus of Figs. 1, 2 and 3 has a round tank 10 with upright outside walls 11 and an inverted frustoconical bottom 12 that slopes gently to the center. A central flotation compartment 13 is defined by an upright annular baffle 14 that extends from a level near the bottom of the tank to above the surface 15 of a pool of water retained in the tank. A peripheral launder 16 extends around the outside wall of the tank and clarified effluent overflows into it.

A superstructure or bridge 17 extends across the tank and is supported by the outside wall. The baffle is supported from this bridge by hangers 18. A rotatable rake assembly 19 is supported from the center of the bridge on the vertical axis of the tank. It comprises an upper bearing member 20 journaled in the bridge and carrying a ring gear 21 which is driven by a motor 22 through conventional belting 23 and reduction gearing 24. A cage 25 is hung from the bearing member and rotates with it. Trussed radial rake arms 26 are rigidly fastened to the bottom of the cage and extend across the tank adjacent the bottom substantially to the outer wall. Conventional rakes 27 on the arms move sludge settling to the bottom of the tank to a sludge well 28 in the bottom of the tank near the center. The well discharges into a sludge outlet pipe 29.

A vertical center well or pipe 30 is disposed on the axis of the tank and projects up through the bottom to a level just below the surface of the pool where it terminates in a funnel-shaped distributor 31. Just above this distributor is an inverted mushroom-shaped member 32 which is fastened to and rotates with the rake assembly. It too, is disposed coaxially and its position may be adjusted up or down by means (not shown) so as to regulate distribution of the incoming charged suspension.

The clarified effluent from the peripheral launder flows to discharge through a pipe 33. That portion of the effluent to be returned flows through a branch pipe 34 to a pump 35 the outlet of which is connected to a conventional eductor 36 having a side leg 37 through which air is sucked into the effluent stream and is dissolved therein at relatively high pressure. The outlet of the eductor is connected through a pipe 38 to a horizontal main 39 through which raw sewage containing suspended solids to be removed, passes to the center well. The pipe 38 is attached to the main 39 tangentially so that the incoming charged stream from the eductor imparts a swirling motion to the sewage and aids in mixing the charged effluent with the stream.

A skim trough 40 is fastened to the inside of the baffle and extends radially to a point in the inner compartment just outside the cage. The top of the skim trough is just above the level of the pool in the tank and on its forward edge it carries a ramp 41 that dips below the liquid level (see Fig. 3). A radial skimming arm 42 is fastened to the cage near the top and extends almost to the baffle. It carries a downwardly extending resilient blade 43 that dips into the pool. When the blade encounters the ramp it flexes backward and carries floated solids it has collected up the ramp and into the trough. After passing the trough the blade springs back into a vertical position and continues to skim the surface of the pool in the inner compartment. The skim trough slopes toward the baffle. Floated solids, accompanied by some water carried up the ramp by the blade, are drained out of the trough by a pipe 44 that passes through the baffle, the outer compartment 45 and the outside wall to discharge.

If desired, reagents to aid in flotation or settlement may be added to the returned eductor stream ahead of the pump through a pipe 46.

In the operation of the apparatus of Figs. 1, 2 and 3, the raw sewage containing dissolved organic matter and suspended solids, both organic and inorganic, is mixed under pressure with the charged effluent from the eductor. The proportion of air drawn into the effluent by the eductor is sufficient to supersaturate the entire stream flowing to the apparatus. When the charged stream escapes into the pool near its surface in the inner compartment, floatable solids are buoyed up by the gas which comes out of solution at the prevailing lower pressure at this point and which attaches as fine bubbles to these particles. In consequence, a layer is formed at and just below the surface in which the floating solids concentrate, and from which they are skimmed as the skimming arm revolves. Solids which do not float settle with substantial rapidity. The more readily settleable solids accumulate at the bottom of the inner compartment. Less readily settleable solids accumulate in the bottom of the outer compartment. Settled solids from both compartments are raked inwardly along spiral paths to the sludge well, from which they are discharged.

The apparatus of Figs. 4 and 5 is similar in principle to that of Figs. 1, 2 and 3, but is simpler. It employs an elongated tank 50 having upright parallel side walls 51 and end walls 52, and a bottom 53 which slopes gently toward the inlet end where it terminates in a sludge sump 54. This extends from side to side of the tank and drains through a sludge outlet pipe 55. The tank is divided into a flotation compartment 56 and a larger sedimentation compartment 57 by a vertical baffle 58 that rises above the level 59 of the pool in the tank and carries a skim trough 60 that extends from side to side of the tank and drains through an outlet pipe 61.

Sewage or other liquid material containing suspended solids is introduced through a riser pipe 62 which terminates in a shallow inlet trough 63 at the inlet end of the apparatus. This shallow trough or weir extends from side to side of the tank and the incoming stream spreads out over it and flows into the top of the flotation compartment. The liquid in the upper few inches of this compartment is skimmed toward the skim trough by a belt-type skimmer 64 formed of an endless belt supported on rollers 65, one or both of which are positively driven by conventional means (not shown). The belt carries a series of resilient skimmer blades 66 which extend perpendicular to the direction of belt travel and dip into the liquid at the top of the pool, carrying floated solids from an upper zone a few inches deep up a ramp 67 and thence into the skim trough. The blades and the ramp extend the full width of the tank. The blades flex backward as they traverse the ramp.

An effluent launder 68 is mounted on the far end of the tank and extends clear across it. Clarified effluent from the pool in the sedimentation compartment overflows into the launder. The launder drains into an effluent discharge pipe 69, which has a branch 70 through which a part of the effluent returns to the system. The branch terminates in a pump 71 which supplies effluent under pressure to an eductor 72. Air is sucked into a side leg 73 of the eductor and is carried by the stream from the eductor through a pipe 74 which enters the riser 62 tangentially so as to bring about mixing. In this fashion the sewage, prior to entering the tank, is charged with air in excess of the solubility of the latter at the pressure obtaining at the surface of the pool. The air consequently comes out of solution and brings about flotation as described in conjunction with Figs. 1, 2 and 3.

Solids which are not floated and skimmed off, sink in the flotation or first compartment, the sinking being aided by the downwardly directed current of the liquid, which flows under the baffle into the sedimentation compartment. In the latter sedimentation is completed. The solids accumulating in the bottom of both compartments are raked to the sludge sump by a conventional submerged endless belt type rake assembly. This comprises a pair of narrow endless belts (or chains) 75, 76 disposed adjacent the respective sides of the tank and mounted on a head pulley (or sprocket) 77, a tail pulley (or sprocket) 78, and an intermediate idler pulley (or sprocket) 79. The head or tail pulley (sprocket) or both are positively driven (clockwise as viewed in Fig. 4) by conventional means (not shown). The belts carry a series of transverse scraper blades 80 which extend the width of the tank and drag along its bottom, moving settled solids from both compartments to the sludge sump.

As in the previous cases, reagents to promote flotation or sedimentation or both may be introduced into the returned effluent stream either ahead of the pump through a pipe 81 or through an additional side or suction leg 82 on the eductor.

The operation of the apparatus of Figs. 4 and 5 should be apparent from the foregoing description. In brief, raw sewage or the like is charged with an excess of dissolved gas, the charging being accomplished through admixture of liquid into which excess air has been introduced. The charged mixture, upon entering the region of lower pressure at the tank inlet, gives up some of its dissolved gas as fine bubbles attached to solids which are buoyed up and skimmed off in the first compartment. Sedimentation takes place in both compartments and the settled sludge from both is raked along the bottom counter-current to the direction of liquid flow and is discharged through the sump. The clarified effluent overflows from the second compartment, and part of it is returned as the charging medium for the influent sewage.

If desired, either of the foregoing types of apparatus may be modified so that the charged liquid and the influent are separately introduced to the flotation compartment. Such modifications are illustrated in Figs. 6 and 7.

Fig. 6 is a fragmentary sectional view of the central portion of the apparatus of Figs. 1, 2 and 3, modified as indicated above. The raw sewage is introduced through the central well as before, but in an uncharged condition. It spreads radially out over the upper portion of the flotation compartment. The effluent return is charged as before with air sucked in through the eductor, and if desired, the same reagents may be incorporated in it either ahead of the pump or through a suction leg on the eductor. However, the charged effluent return passes through a vertical pipe 85 disposed on the axis of the apparatus and directed downward from above the bridge. This pipe has a rotatable coupling 86 above the bridge. Its upper portion is stationary, but its lower portion is fastened to and rotates with the cage which carries the rake structure and the skimming arm. The rotating portion of the vertical pipe has a plurality of radial branches 87 which extend over the top of the bridge, then down, and finally out and across the flotation compartment at a level below that at which the influent is introduced. The lower portions of the branches are perforated on their upper sides and serve to distribute the charged effluent return across the entire flotation compartment as they rotate with the bridge. They are submerged sufficiently to clear the bottom of the skim trough as they are carried around.

The charged effluent return, as it enters the pool of liquid in the flotation compartment, encounters a pressure such that its excess gas is released, to accomplish pressure flotation by attaching to solid particles and buoying them up within reach of the skimmer. Particles not so buoyed up tend to sink in the sedimentation compartment as in the case of the operation conducted in the equipment of Figs. 1, 2 and 3.

Figure 7:
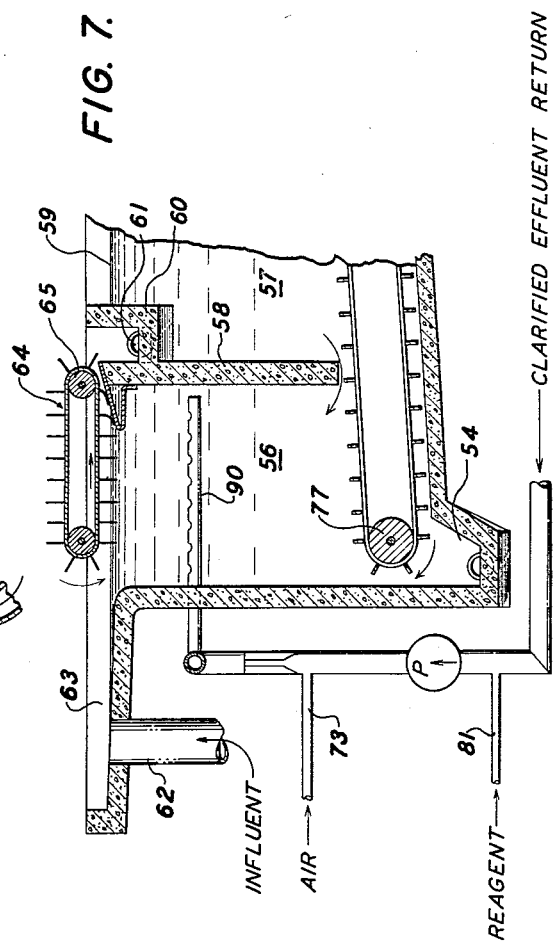
Fig. 7 is a fragmentary section illustrating a similar modification of the apparatus of Figs. 4 and 5.

In the modification of the equipment of Figs. 4 and 5, as illustrated in Fig. 7, a similar action occurs. In this instance, the influent is permitted to pass up the riser, through the shallow distribution weir and into the top of the flotation compartment without aeration. The super-charged returned effluent from the eductor is introduced into the flotation compartment through a series of horizontal pipes 90 that project through the end wall of the flotation compartment and extend substantially the entire length of the compartment. These pipes are perforated and the charged influent flows through the perforations below the level at which the sewage is introduced, with the results already described in connection with Fig. 6.

Aeration of sewage, in accordance with the practice of the invention, accomplishes a dual function in that it (1) accomplishes flotation and markedly reduces the load of solids to be removed by sedimentation, and (2) readily supplies the biological oxygen demand of the sewage, avoiding putrescence in the apparatus, etc. Consequently, air is the preferred gas when the invention is employed in sewage treatment when the B. O. D. is substantial. In other cases, other gases may be preferred, and good results have been obtained with waste carbon dioxide, flue gases, etc.

In both forms of apparatus illustrated the sludge from both compartments is removed from the bottom of the flotation compartment. This is preferred practice and ordinarily yields a denser sludge. However, if desired the sludge can all be raked to and removed from the bottom of the sedimentation compartment and it is within the scope of the invention to separately remove the sludge settling in the bottom of the two compartments.

One of the outstanding advantages of the invention is that it may be applied in a number of types of existing sewage equipment. The modifications required in such equipment in order to practice the invention are relatively inexpensive. Yet the modifications, once accomplished, may increase the capacity of the equipment several fold—an important factor in these days when many sewage treatment plants are already overloaded and construction costs are high. With average municipal sewage and conventional clarification apparatus, it is usually unsafe to provide less than one square foot of tank area per thousand gallons of sewage per twenty-four hours. Thus, for a sewage flow of one million gallons per day a circular clarifier tank about 36 feet in diameter or a rectangular tank of equal plan area (say 12 feet wide and 83 feet long) is required. The same tanks, modified to practice the instant invention, will have a daily capacity for the same class of sewage of at least two million gallons, or expressed in another way, the million gallons daily can be handled in a circular tank of not to exceed 25 feet in diameter or in a rectangular tank 12 feet wide and about 40 feet long.

The flotation compartment need be only a small fraction of the total tank, experience having shown that adequate flotation can be accomplished while providing from only one square foot of tank plan area for each 5000 to 10,000 gallons of sewage per day. As indicated above, the total tank plan area, including that of both compartments, can be reduced by half, to 1 square foot per 2000 gallons of sewage per 24 hours. This is equivalent to 2.5 square feet per 5000 gallons per 24 hours or 5.0 square feet per 10,000 gallons per 24 hours. Hence it will be apparent that the plan area required for the flotation compartment is less than half of the total tank plan area. Stated in another way, the plan area of the flotation compartment is, advantageously, substantially smaller than the plan area of the sedimentation compartment.

The material which floats to the top of the pool in conventional clarification apparatus employed in the treatment of sewage is difficult to skim and remove. Ordinarily it is necessary to remove a large proportion of water with such scum, which reduces the efficiency of the operation and requires further treatment. However, in the practice of the invention, not only is the proportion of floating material increased, but its quality is changed so that it becomes easy to skim off a product of much lower water content that requires no subsequent treatment.

The practice of the invention permits the flotation and clean separation in a small area not only of the solids that would form a scum regardless of air addition, but also of a large proportion of the solids which tend to settle very slowly. In this way, the load on sedimentation is decreased greatly, so much so that the overall capacity of the apparatus, in terms of plan area, is often more than doubled.

The invention provides a further advantage in the treatment of sewage containing material which tends to precipitate, for example, sewage containing a large proportion of oily waste. Part, but not all, of these oily substances is removed by flotation. The balance tends to precipitate and settle slowly, but is trapped in the second compartment and does not precipitate afterward in the apparently clarified effluent, as has occurred heretofore.

We claim:

1. In apparatus for treating sewage containing both dissolved organic matter and suspended organic solids, the combination which comprises a tank open to the atmosphere for containing a pool of the sewage, an upwardly extending baffle in the tank spaced from the bottom thereof and extending above the surface of the pool and dividing the tank into a first compartment in which some of the solids in the sewage float and some of the solids settle and a second compartment in which some of the solids settle, the two compartments being in communication with each other under the baffle and the first compartment being smaller than the second compartment with respect to plan area, means for introducing into the first compartment a stream of the sewage and a liquid stream, means for pressurizing the liquid stream and for dissolving in it an oxygen-containing gas in excess of the proportion of the gas which the combined streams of liquid and sewage will dissolve, means for retaining the excess of gas in solution until the stream containing it has entered the pool, means for removing from the upper portion of the pool in the first compartment solids buoyed up by the gas coming out of solution in the pool, an outlet for settled solids in the bottom of the tank underlying the first compartment, means overlying the bottom of the tank in both compartments for moving settled solids to the outlet from the bottom of both compartments, and means for removing clarified liquid effluent from an upper portion of the second compartment.

2. In apparatus for treating sewage containing both dissolved organic matter and suspended organic solids, the combination which comprises an elongated tank open to the atmosphere for containing a pool of the sewage, a baffle extending across the tank and spaced from the bottom thereof and extending above the surface of the pool and dividing the tank into a first compartment in which some of the solids in the sewage float and some of the solids settle and a second compartment in which some of the solids settle, the two compartments being in communication with each other under the baffle and the first compartment being smaller than the second compartment with respect to plan area, means for introducing into the first compartment a stream of the sewage and a liquid stream, means for pressurizing the liquid stream and for dissolving in it an oxygen-containing gas in excess of the proportion of the gas which the combined streams of liquid and sewage will dissolve, means for retaining the excess of gas in solution until the stream containing it has entered the pool, means for removing from the upper portion of the pool in the first compartment solids buoyed up by the gas coming out of solution in the pool, an outlet for settled solids in the bottom of the tank underlying the first compartment, means overlying the bottom of the tank in both compartments for moving settled solids longitudinally to the outlet from the bottom of both compartmens, and means for removing clarified liquid effluent from an upper portion of the second compartment.

3. Apparatus according to claim 2 in which the means for moving settled solids longitudinally to the outlet in the bottom of the tank is an endless belt extending longitudinally of the tank just above its bottom.

4. In apparatus for treating sewage containing both dissolved organic matter and suspended organic solids, the combination which comprises a tank open to the atmosphere for containing a pool of the sewage, an upwardly extending annular baffle in the tank spaced from the bottom thereof and extending above the surface of the pool and dividing the tank into an inner compartment in which some of the solids in the sewage float and some of the solids settle and an outer annular compartment in which some of the solids settle, the two compartments being in communication with each other under the baffle and the inner compartment being smaller in plan area than the outer compartment, means for introducing into the inner compartment a stream of the sewage and a liquid stream, means for pressurizing the liquid stream and for dissolving in it an oxygen-containing gas in excess of the proportion of the gas which the combined streams of liquid and sewage will dissolve, means for retaining the excess of gas in solution until the stream containing it has entered the pool, means for removing from the upper portion of the pool in the inner compartment solids buoyed up by the gas coming out of solution in the pool, an oulet for settled solids in the bottom of the tank underlying the inner compartment, means overlying the bottom of the tank in both compartmetns and rotating about a point in the bottom of the inner compartment for moving settled solids to the outlet from the bottoms of both compartments, and means for removing clarified liquid effluent from an upper portion of the outer compartment.

5. Apparatus according to claim 4 in which the means for removing the buoyed-up solids from the upper portion of the inner compartment comprises an arm extending at least partially across the inner compartment and rotatable about the surface of the pool.

6. Apparatus according to claim 4 in which the means for removing the buoyed-up solids from the upper portion of the inner compartment comprises an arm extending at least partially across the inner compartment and rotatable in a plane substantially parallel with the surface of the pool, a resilient blade on the arm at the level of the pool in the inner compartment, a skim trough in the inner compartment approximately at the level of the pool, and an upwardly extending ramp on the side of the trough which the arm approaches as it rotates.

7. In apparatus for treating sewage containing both dissolved organic matter and suspended organic solids, the combination which comprises a tank open to the atmosphere for containing a pool of the sewage, an upwardly extending baffle in the tank spaced from the bottom thereof and extending above the surface of the pool and dividing the tank into a first compartment in which some of the solids in the sewage float and some of the solids settle and a second compartment in which some of the solids settle, the two compartments being in communication with each other under the baffle and the first compartment being smaller in plan area than the second compartment, means for introducing into the first compartment a stream of the sewage, means for separately introducing into the pool in the first compartment a separate liquid stream at a level below that at which the sewage is introduced, means for pressurizing the liquid stream and for dissolving in it prior to its introduction into the pool an oxygen-containing gas in excess of the proportion of the gas which the combined streams of liquid and sewage will dissolve, means for retaining the excess of gas in solution until the liquid stream has entered the pool, means for removing from the upper portion of the pool in the first compartment solids buoyed up out of the sewage by the gas coming out of solution in the pool, an outlet for settled solids in the bottom of the tank underlying the first compartment, means overlying the bottom of the tank in both compartments for moving settled solids to the outlets from the bottom of both compartments, and means for removing clarified liquid effluent from an upper portion of the second compartment.

8. Apparatus according to claim 7 in which the means for introducing the separate liquid stream containing the dissolved gas is a pipe perforated lengthwise and extending at least partially across the first compartment substantially below the upper surface of the pool.

9. In apparatus for treating sewage containing both dissolved organic matter and suspended organic solids, the combination which comprises a tank open to the atmosphere for containing a pool of the sewage, an upwardly extending baffle in the tank spaced from the bottom thereof and extending above the surface of the pool and dividing the tank into a first compartment in which some of the solids in the sewage float and some of the solids settle and a second compartment in which some of the solids settle, the two compartments being in communication with each other under the baffle and the first compartment being smaller in plan area than the second compartment, means for introducing into a stream of the sewage a liquid stream prior to the introduction of the sewage into the first compartment, means for pressurizing the liquid stream and for dissolving in it prior to its introduction into the sewage an oxygen-containing gas in excess of the proportion of the gas which the combined streams of liquid and sewage will dissolve, means for retaining the excess of gas in solution in the combined streams until the combined streams have entered the pool, means for removing from the upper portion of the pool in the first compartment solids buoyed up by the gas coming out of solution in the pool, an outlet for settled solids in the bottom of the tank underlying the first compartment, raking means overlying the bottom of the tank in both compartments for moving settled solids to the outlet from the bottom of both compartments, and means for removing clarified liquid effluent from an upper portion of the second compartment.

(References on following page)

References Cited in the file of this patent

UNITED STATES PATENTS

| | | | |
|---|---|---|---|
| 864,856 | Norris | Sept. 3, | 1907 |
| 2,094,909 | Baily et al. | Oct. 5, | 1937 |
| 2,233,792 | Mallory | Mar. 4, | 1941 |
| 2,237,172 | Briggs | Apr. 1, | 1941 |
| 2,246,224 | Streander | June 17, | 1941 |
| 2,307,154 | Osuna | Jan. 5, | 1943 |
| 2,324,400 | Kelly et al. | July 13, | 1943 |
| 2,330,589 | Juell | Sept. 28, | 1943 |
| 2,360,811 | Kelly et al. | Oct. 17, | 1944 |
| 2,370,974 | Langdon | Mar. 6, | 1945 |
| 2,477,459 | Kelly | July 26, | 1949 |
| 2,679,477 | Kivari et al. | May 25, | 1954 |